Nov. 28, 1950 C. W. HANSEN ET AL 2,532,164
WINDROWER
Filed May 13, 1946 3 Sheets-Sheet 1
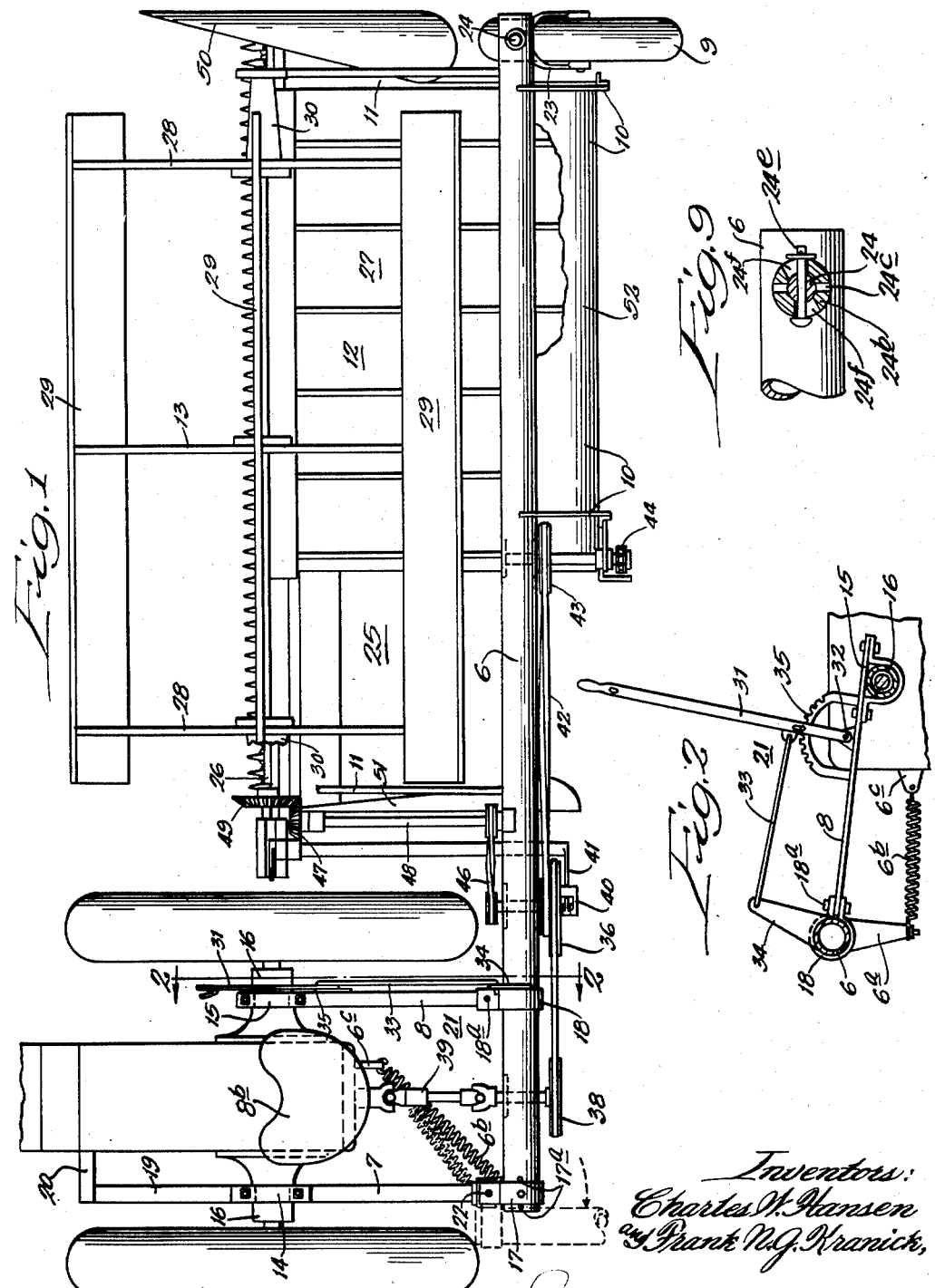
Inventors:
Charles W. Hansen
and Frank N. G. Kranick,
By Soans, Pond & Anderson
Attorneys.

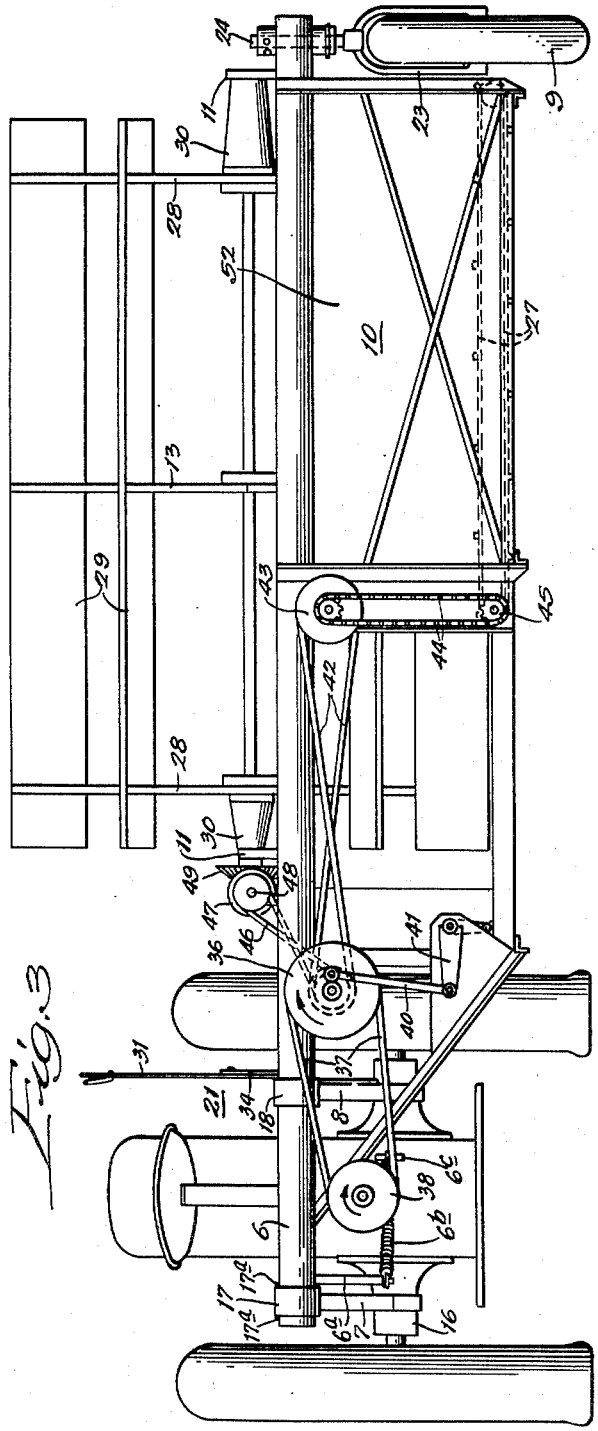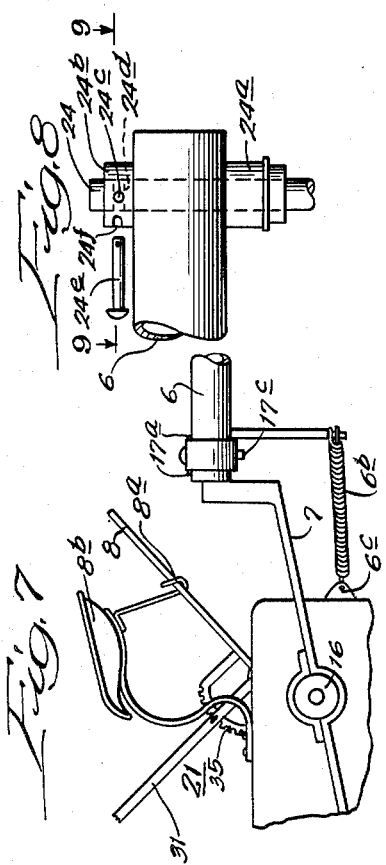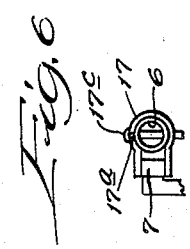

Nov. 28, 1950     C. W. HANSEN ET AL     2,532,164
WINDROWER
Filed May 13, 1946                                    3 Sheets-Sheet 3
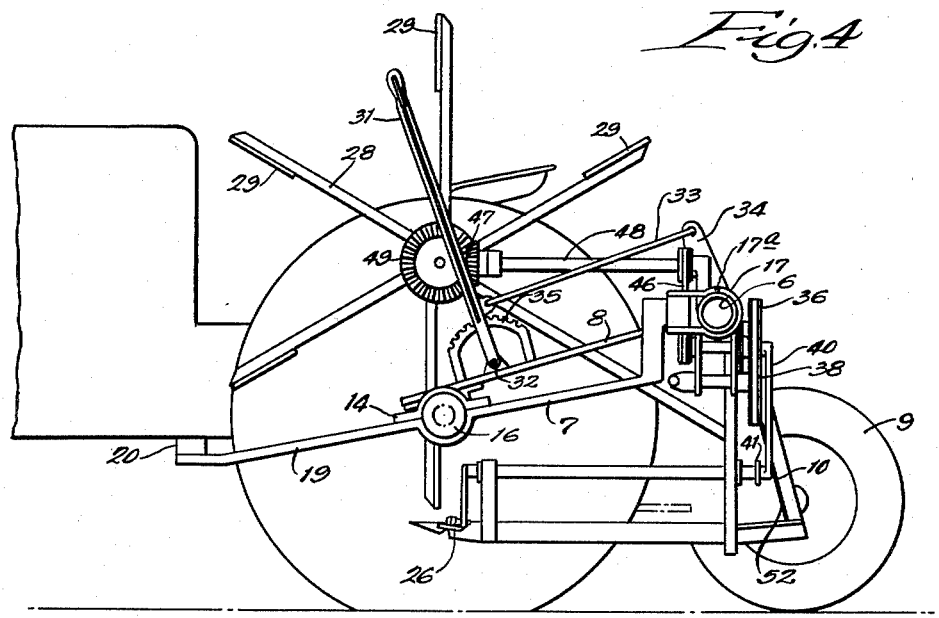
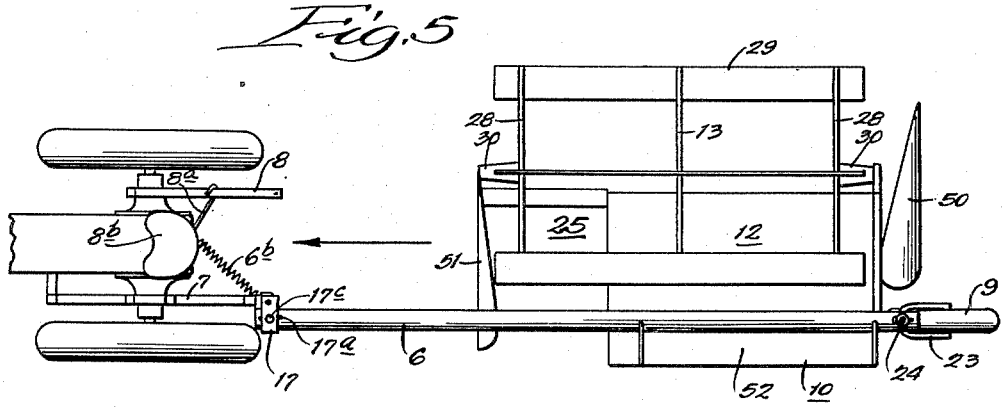
Inventors:
Charles W. Hansen
and Frank N. G. Kranick,
By Soans, Pond & Anderson
Attorneys.

Patented Nov. 28, 1950

2,532,164

UNITED STATES PATENT OFFICE 2,532,164

WINDROWER

Charles W. Hansen and Frank N. G. Kranick, Racine, Wis., assignors to J. I. Case Company, Racine, Wis., a corporation of Wisconsin Application May 13, 1946, Serial No. 669,393

10 Claims. (Cl. 56—23)

This invention relates to harvesting machines of the type commonly known as windrowers because they are used for cutting grain and laying it along the ground in windrows, as such a machine traverses a field of grain. Machines of this kind require such a construction and arrangement of their several parts that, whether pulled or pushed, they will accomplish two major results with the greatest possible effectiveness.

First, the machine must be capable of such adjustment that it may be accommodated to grain of various heights and conditions of stand. Secondly, the machine must lay the grain in windrows so that they will not have to be traversed subsequently by the machine, or the draft means, as the normal harvesting operation continues.

The main objects of this invention, therefore, are to provide an improved windrower of the type to be detachably connected at the side of a tractor; to provide an improved construction and arrangement of a main supporting member whereon the grain reel and the cutting and conveying mechanisms are supported; to provide an improved bracket arrangement whereby said main supporting member with its mechanism may be quickly and easily attached to or detached from a tractor; to provide improved connections for said member and brackets which permit the rotation of said member in said brackets for regulating the angularity of the supported mechanisms with respect to the horizontal, and which also permit the swinging of said member and its supported mechanisms from an operating position at the side of a tractor to a trailing position at the rear of a tractor; to provide improved means for effecting the rotation of said supporting member on said brackets for altering the position of said grain reel and the cutting and conveying mechanism; to provide a windrower of this type which, by virtue of its attachment to the tractor, permits the operator, when seated on the tractor, to have a constant and rather complete view of the aforesaid reel and mechanism, as well as the grain and ground conditions directly in advance of these parts; and to provide an improved windrower of this type which is light in weight yet possessing great strength and stability.

In the particular embodiment of the invention herein shown;

Fig. 1 is a plan view of a windrower, constructed in accordance with this invention, mounted at the side of a tractor;

Fig. 2 is a side elevation of the means for effecting the angular adjustment of the grain reel and the cutting and conveying mechanism with regard to the horizontal, the view being taken on the line 2—2 of Fig. 1;

Fig. 3 is a rear end elevation of the windrower and tractor as shown in Fig. 1;

Fig. 4 is a left-hand side elevation of the same, the tractor wheels being indicated in dotted outline;

Fig. 5 is a reduced plan view showing, more or less in general outline, the trailing position of the windrower with regard to the tractor when it is being moved from field to field;

Fig. 6 is an enlarged detail view showing the locking means for securing the main supporting member against rotation on its axis when the windrower is swung to transportation position as shown in Fig. 5;

Fig. 7 is a detail view showing means whereby one of the connections for the supporting member is held in retracted position when the windrower is in transportation position with respect to the tractor;

Fig. 8 is an enlarged detail view showing an arrangement whereby the supporting caster wheel for the windrower mechanism is locked against swiveling during transportation of the windrower; and Fig. 9 is a sectional view taken on the line 9—9 of Fig. 8 with the parts assembled.

Because so much of the structure and mechanisms herein shown are of a conventional nature no attempt has been made to be exact and complete in the illustration thereof. It is assumed that the form and connections will be readily understood from their outline or diagrammatic appearance in the drawings.

A side-draft windrower, constructed in accordance with this invention, comprises a main or primary supporting member 6 adapted to have its one or inner end detachably secured to a tractor by means of rearwardly-extending bracket 7 and link 8, and its other or outer end supported on a caster wheel 9. By means of an auxiliary frame work 10 and arms 11 a grain-cutting and -conveying mechanism 12 and a grain reel 13 are supported in operative positions, respectively, below and forwardly of the main supporting member 6 at one side of the tractor. Suitable driving mechanism is mounted on the member 6, power for which is obtained from the tractor, for operating the grain-cutting and -conveying mechanism 12 and the grain reel 13, as will appear more fully hereinafter.

The main or primary supporting member or bar 6 is preferably of tubular form. It is of a diameter and material that will possess the strength sufficient to stably support the mechanisms hereinbefore mentioned, and permit the attached tractor to operatively draw them along the grain field.

The bracket 7 and link 8, by which the supporting member 6 is secured in draft relationship to the tractor, are provided with collar members 14 and 15 by which these parts are attached to the tractor axle 16. The bracket 7, being also anchored at 20 to the tractor frame, provides cantilever support for one end of the bar 6 which is supported at its outer end on the wheel 9. The bracket and link extend rearwardly of the bull wheels of the tractor at an incline to the horizontal. At their outer ends they have other collar members 17 and 18, respectively, which embrace the supporting member 6 to permit its rotation about its own axis. The link 8 provides support for a shifting mechanism 21 whereby the member 6 may be given the required partial rotating movement in the collars 17 and 18 so as to adjust the angularity of the grain reel and the grain-cutting and -conveying mechanism with regard to the horizontal, as will appear more fully hereinafter.

The collar members 14 and 15, and 17 and 18, are all of a construction that employ suitable bolts and nuts to permit their appropriate attachment to or detachment from the axle frame 16 and the supporting member 6, respectively. By its collar member 14, the bracket 7 is secured rigidly to the motor axle bearing 16, whereas the link collar member 15 is loosely supported on the axle frame to permit slight pivotal action as may be required by the up and down "floating" movement of the supporting member 6, as caused by the travel of the wheel 9 over the uneven ground. The collar member 17 is pivoted at 22 (Fig. 1) to the bracket 7 so that, when the collar member 18 is disconnected from the member 6 it, and the supported grain reel and cutting and conveying mechanisms, may be swung through an angle of 90° to trail at the rear of the tractor for transportation of the windrower from place to place. The pivot 22 is made with sufficient slack to allow for the above-mentioned "floating" movement of the member 6. Pins 17a hold the member 6 in place in the collar member 17.

The wheel 9 is mounted in a yoke support 23 which is provided with a conventional swivel connection 24 to the end of the member 6 whereby the wheel may accommodate itself to the uneven and irregular conditions of the ground, over which it must travel, and the position of the windrower with regard to the tractor. The swivel connection 24 is carried in appropriate bushings 24a and 24b (see Fig. 8), the bushing 24b having an opening for registration with an opening 24d in the swivel pin 24. This permits the insertion of a pin 24e in the alined openings 24c and d so that the wheel is fixed in the position to which it swings when the windrower is swung to the rear of the tractor for transport purposes. Bushing 24b also has elongated openings 24f through which the pin 24e extends when wheel 9 is in the position shown in Figs. 1 to 4 inclusive, engagement of pin 24e with the margins of openings 24f serving to limit the swinging of wheel 9 and prevent accidental contact with adjacent parts of the structure.

The auxiliary frame 10 is suspended from the underside of the main supporting member 6 and provides support for a platform (not shown in the figures) upon which is mounted the grain-cutting and -conveying mechanism 12. This auxiliary frame 10 spans approximately one-half the distance between the outer end of the bar 6, and the adjacent bull wheel of the tractor. There is thus provided an opening 25, between the end of the grain-conveying means and the tractor, through which the harvested grain may fall for deposit on the ground in windrows.

The arms 11 extend forwardly of the member 6, and are suitably reinforced by struts connected to the auxiliary frame 10 and to extensions of the conveyor platform, so as to provide ample support for the grain reel 13.

The grain-cutting and -conveying mechanism 12, being of conventional construction, employs the usual sickle, reciprocatingly supported on a guide bar 26, and an apron, draper, or conveyor belt 27. The grain sickle and its supporting guard bar 26 are secured along the front of the platform, which supports the apron, draper, or conveyor belt 27, and entirely across the opening 25. The apron, draper, or conveyor belt 27 is the usual slatted canvas mounted on suitable rollers at the ends of a supporting platform and movable so that the grain falling thereupon is delivered to and dropped through the opening 25.

The grain reel 13, likewise of a conventional form, has a plurality of spaced radially-arranged arms 28 connected at their outer ends by bats 29 and secured at their inner ends to a shaft journaled in suitable bearings enclosed in the conical shields 30 mounted on the outer ends of the arms 11. The arms 11 are of such length that they support the reel in the usual position above the sickle and its guide bar 26.

The adjusting mechanism 21, for shifting the grain-cutting and -conveying mechanism with respect to the horizontal, so as to raise and lower the cutter bar, comprises a lever 31 pivoted at 32 to the link 8 and connected by a link 33 to an arm 34 secured to the main supporting member 6. Thus a shifting of the lever rotates the member 6 in the collar members 17 and 18. The usual spring-actuated detent (not shown) is arranged on the lever to co-act with the notched segment 35 for locking the lever in any one of the several of its possible positions.

Obviously, it is necessary to effectively counterbalance the weight of the forwardly-extending parts, carried by the supporting member 6, so that such parts may be readily shifted by the aforesaid adjusting mechanism 21. Moreover, such a counter-balance is needed to hold the grain-cutting and -conveying mechanism free of the ground during the transportation of the windrower from field to field. To that end an arm 6a is secured to the collar member 17, or to the supporting member 6 adjacent to said collar member, which arm extends downwardly opposite the arm 34. A spring 6b is attached to this arm and to the opposite rear corner of the tractor frame. The connection of the spring 6b to the end of the arm 6a is in the nature of a swivel so that it will permit the bar, and its attachment, to be swung to the position behind the tractor as shown in Fig. 5. Suitable means for adjusting the tension of this spring 6b would be supplied in order to vary the counter-balancing effect as occasion might require.

The driving means for the grain-cutting and -conveying mechanism 12 and the grain reel 13 comprises a main pulley 36 journaled on the main supporting bar 6 and connected by a belt 37 to a pulley 38 likewise journaled on the main supporting frame 6 and connected by a dual universal and slip joint 39 (see Fig. 1) to the tractor power unit.

The pulley 36 is connected to operate the sickle by means of a pitman 40 connected to a bell crank lever 41 which, in turn, is connected to the sickle. Likewise the pulley 36 is connected to operate the apron, draper, or conveyor belt 27 through the medium of a crossed belt 42 connected to a pulley 43 journaled on the main supporting bar 6 and which, in turn, is connected by a chain 44 to a sprocket 45 connected to the left-hand end roller around which the apron, draper, or conveyor belt 27 extends. Also the pulley 36 is connected to operate the grain reel 13 through a medium of a crossed belt 46 connected to a pulley 47 which is connected to the grain reel 13 by means of a shaft 48 and a pair of beveled gears 49.

The usual dividers 50 and 51 are arranged at opposite ends of the grain-cutting and -conveying mechanism 12. A windshield 52 extends throughout the length of the platform which supports the grain-cutting and -conveying mechanism 12, extending from the rear edge of the platform up to the bar 6, which serves to minimize the wind's interference with the proper laying of the grain on the conveyor belt 27 as it is severed by the sickle.

The operation of the windrower will be more or less obvious from the foregoing description. Sitting in the seat of the tractor, the operator has a more or less clear view of the grain and ground conditions directly in front of the windrower and may operate the controls of the tractor and windrower as he sees circumstances require.

When it is desired to transport the windrower in inoperative condition from place to place it is only necessary to drop a pin 17c through registering openings in the collar member 17 and the frame member 6 and then disconnect the collar 18 and the adjusting mechanism 21 from the supporting member 6. Thereupon the frame 6 and the supported parts will swing to the rear of the tractor as shown in Fig. 5. The wheel 9 automatically accommodates itself to this changed relationship to tractor and windrower. After inserting the pin 24e into the registering openings 24c and d the wheel 9 will be restrained against its free swinging during the transport of the windrower. The link 8, when disconnected from the member 6, is suspended from a hook attached to the bottom of the tractor seat 8b.

Variations and modifications in the details of structure and arrangement of the parts may be resorted to within the spirit and coverage of the appended claims.

We claim:

1. In a windrower which is adapted to be used with a tractor, a main frame which includes a horizontally disposed, main supporting bar, said bar being adapted to extend generally transversely of the line of draft of the associated tractor, a wheel, means for attaching one end of said supporting bar to said wheel, a pair of supporting members, means attaching said main supporting bar to said supporting members for limited rotatable movement about a horizontally disposed, transversely extending axis, and means for attaching said supporting members to the rearward end of the tractor.

2. In a windrower which is adapted to be used with a tractor, a main frame which includes a horizontally disposed, main supporting bar, said bar being adapted to extend generally transversely of the line of draft of the associated tractor, a wheel, means for attaching said supporting bar to said wheel, a pair of supporting members, means for attaching each of the said supporting members to said bar at spaced-apart points for limited rotatable movement about a horizontally disposed, transversely extending axis, means for rigidly attaching one of said supporting members to the tractor, and means for pivotally connecting the other of said supporting members to the tractor.

3. In a windrower which is adapted to be used with a tractor, a main frame which includes a horizontally disposed tubular member, a wheel, means for attaching one end of said tubular member to said wheel, an auxiliary frame attached to said tubular member, a sickle bar supported on said auxiliary frame in generally parallel relation to said tubular member, a pair of spaced-apart supporting members, means attaching said tubular member to one end of each of said supporting members for limited rotatable movement about an axis parallel to the axis of said tubular member, and means for attaching the other end of each of said supporting members to spaced-apart points on the rearward end of the associated tractor, whereby rotation of said tubular member relative to said supporting members is operable to vertically position said sickle bar relative to the ground.

4. In a windrower which is adapted to be used with a tractor, a main frame which includes a horizontally disposed, tubular member, a caster-type wheel, means for attaching said caster wheel to said tubular member, an auxiliary frame attached to said tubular member, a sickle bar supported on said auxiliary frame in generally parallel relation to said tubular member, a pair of spaced-apart, supporting members, means for attaching said tubular member to said supporting members for limited rotatable movement, means for attaching each of said supporting members to the rearward end of the associated tractor, at least one of said supporting members being rigidly attached to said tractor, whereby rotation of said tubular member is operable to vertically position said sickle bar relative to the ground.

5. In a windrower which is adapted to be supported upon a tractor, a main frame which includes a horizontally disposed tubular member, a caster-type support wheel, means for attaching said caster wheel to said tubular member, an auxiliary frame attached to said tubular member, a sickle bar and a conveyor supported on said auxiliary frame in generally parallel relationship with said tubular member, a pair of spaced-apart, supporting members, a collar on each of said supporting members for embracing said tubular member, means for rigidly attaching one of said supporting members to the rearward end of the associated tractor, and means for pivotally attaching the other of said supporting members to the tractor.

6. In a windrower which is adapted to be used with a tractor, a main frame which includes a horizontally disposed tubular member, a caster-type support wheel, means for attaching said caster wheel to said tubular member, an auxiliary frame attached to said tubular member, a sickle bar and a conveyor supported on said auxiliary frame in generally parallel relationship with said tubular member, a pair of spaced-apart, supporting members, a collar on each of said supporting members for embracing said tubular member, means for rigidly attaching one of said supporting members to the rearward end of the associated tractor, means for pivotally attaching the other of said supporting members to the said tractor, means associated with one of said supporting members for rotating said tubular member within said collars to position said sickle bar to determine the height of cut, and means for locking said tubular member in a predetermined position within said collars.

7. In a windrower which is adapted to be used with a tractor, a main frame which includes a horizontally disposed main supporting bar which is swingable from an operating position generally transverse to the line of travel of the associated tractor, to a transport position parallel to the line of travel of the said tractor, a support wheel, means for attaching one end of said supporting bar to said support wheel, a pair of supporting members, means attaching said supporting bar to said supporting members for limited rotatable movement about a transversely extending, horizontally disposed axis, and means for attaching said supporting members to the associated tractor, one of said supporting members being releasably connected to said supporting bar, and the other of said supporting members including a vertically disposed pivot whereby, upon release of said releasable supporting member, said supporting bar swings rearwardly about said vertically extending pivot to the transport position.

8. In a windrower which is adapted to be used with a tractor, a main frame which includes a horizontally disposed main supporting bar which is swingable from an operating position which is generally transverse to the line of travel of the associated tractor to a transport position parallel to the line of travel of the tractor, a caster-type support wheel, means for attaching one end of said supporting bar to said caster wheel, an auxiliary frame attached to said main supporting bar, a sickle bar, means for connecting said sickle bar to said main frame in a position generally parallel to said main supporting bar, a pair of spaced-apart, supporting members, means attaching said supporting bar to said supporting members for limited rotatable movement about an axis parallel to the axis of said main supporting bar, and means for attaching said supporting members to the associated tractor, one of said supporting members being adapted to be pivotally connected to said tractor about a horizontally disposed pivot and being releasably connected to said supporting bar, and the other of said supporting members being adapted to be rigidly attached to said tractor and including a vertically disposed pivot whereby, upon release of said releasable supporting member, said supporting bar is swingable rearwardly about said vertically extending pivot to the transport position.

9. In a windrower which is adapted to be used with a tractor, a main frame which includes a horizontally disposed main supporting bar which is swingable from an operating position which is generally transverse to the line of travel of the associated tractor to a transport position parallel to the line of travel of the tractor, a caster-type support wheel, means for attaching one end of said supporting bar to said caster wheel, a supporting bracket and a supporting link, means for attaching the other end of said supporting bar to said supporting bracket for limited rotatable movement about an axis parallel to the axis of said main supporting bar, means for rotatably attaching said link to said supporting bar at a point spaced from said bracket, and means for rigidly attaching said supporting bracket to the said tractor, means for pivotally attaching said link to the said tractor, said link being releasably connected to said supporting bar, and said bracket including a vertically disposed pivot whereby upon release of said releasable link said supporting bar is swingable rearwardly about said vertically extending pivot to the transport position.

10. In a windrower which is adapted to be used with a tractor, a main frame which includes a horizontally disposed tubular member which is swingable from an operating position which is generally transverse to the line of travel of the associated tractor to a transport position parallel to the line of travel of the tractor, a caster-type support wheel, means for attaching one end of said tubular member to said caster wheel, a supporting bracket one end of which is adapted to be rigidly attached to the associated tractor, a collar pivotally attached to the other end of said bracket by means of a vertically extending pivot, a supporting link one end of which is adapted to be pivotally attached to said tractor, a collar attached to the other end of said link, the other end of said tubular member being journaled for limited rotatable movement in said collars on said bracket and said link, a grain cutting and conveying mechanism, means for supporting said mechanism on said tubular member including an auxiliary frame attached to said tubular member, means for rotating said tubular member within said collars and for holding said tubular member in a predetermined position whereby said grain cutting and conveying mechanism is vertically positioned, said supporting link having a releasable connection whereby said tubular member is permitted to swing from the operating position about said vertically extending pivot on said bracket collar to the transport position.

CHARLES W. HANSEN.
FRANK N. G. KRANICK.

REFERENCES CITED

The following references are of record in the file of this patent:

UNITED STATES PATENTS

| Number | Name | Date |
|---|---|---|
| 539,080 | Ordway | May 14, 1895 |
| 1,905,409 | Innes | Apr. 25, 1933 |
| 1,960,277 | Pearson | May 29, 1934 |
| 2,166,942 | Crumb | July 25, 1939 |
| 2,375,848 | Hume | May 15, 1945 |
| 2,413,873 | Hume | Jan. 7, 1947 |